United States Patent
Darvish et al.

(10) Patent No.: US 10,690,693 B2
(45) Date of Patent: Jun. 23, 2020

(54) SENSOR COMPRISING AN INTEGRATED IDENTIFICATION DEVICE

(71) Applicant: Continental Teves AG & Co. oHG, Frankfurt (DE)

(72) Inventors: Abtin Darvish, Kronberg (DE); Ralf Endres, Groß-Gerau (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 15/103,408

(22) PCT Filed: Oct. 8, 2014

(86) PCT No.: PCT/EP2014/071586
§ 371 (c)(1),
(2) Date: Jun. 10, 2016

(87) PCT Pub. No.: WO2015/090663
PCT Pub. Date: Jun. 25, 2015

(65) Prior Publication Data
US 2016/0305976 A1   Oct. 20, 2016

(30) Foreign Application Priority Data

Dec. 17, 2013   (DE) .................. 20 2013 011 157

(51) Int. Cl.
*G01P 3/44* (2006.01)
*G01P 3/489* (2006.01)
(Continued)

(52) U.S. Cl.
CPC .............. *G01P 3/489* (2013.01); *G01D 21/00* (2013.01); *G01P 3/44* (2013.01); *G01P 3/4802* (2013.01)

(58) Field of Classification Search
CPC .......... G01P 3/489; G01P 3/4802; G01P 3/44; G01D 21/00; G01N 21/31
(Continued)

(56) References Cited

U.S. PATENT DOCUMENTS 5,050,292 A * 9/1991 Zirbes .................... G01V 15/00
29/595
5,437,275 A * 8/1995 Amundsen ......... A61B 5/14552
600/323

(Continued)

FOREIGN PATENT DOCUMENTS

DE      3902767      8/1990
DE     10337967      4/2004
(Continued)

OTHER PUBLICATIONS

International Search Report and Written Opinion of the International Searching Authority for International Application No. PCT/EP2014/071586 dated Dec. 15, 2014.
(Continued)

*Primary Examiner* — Herbert K Roberts
(74) *Attorney, Agent, or Firm* — RatnerPrestia

(57) ABSTRACT

A sensor including at least one sensor element, at least one signal processing circuit, and at least one housing inside which the sensor element and the signal processing circuit are arranged. The sensor further includes an electronic identification device.

9 Claims, 1 Drawing Sheet

(51) Int. Cl.
*G01D 21/00* (2006.01)
*G01P 3/48* (2006.01)

(58) Field of Classification Search
USPC ................................................ 73/514.39
See application file for complete search history.

(56) References Cited

U.S. PATENT DOCUMENTS

| | | | |
|---|---|---|---|
| 5,827,182 A * | 10/1998 | Raley | A61B 5/14552 |
| | | | 600/323 |
| 7,519,499 B2 | 4/2009 | Skinner | |
| 8,179,266 B2 | 5/2012 | Rolf | |
| 9,061,454 B2 | 6/2015 | De Volder et al. | |
| 9,266,267 B2 | 2/2016 | De Volder | |
| 2002/0059826 A1* | 5/2002 | Ono | B60C 23/061 |
| | | | 73/146.5 |
| 2004/0103723 A1 | 6/2004 | Kirschbaum | |
| 2004/0150516 A1 | 8/2004 | Faetanini | |
| 2005/0126668 A1 | 6/2005 | Fornerod | |
| 2006/0185429 A1* | 8/2006 | Liu | B60C 23/0408 |
| | | | 73/146.5 |
| 2009/0189738 A1* | 7/2009 | Hermle | G01D 3/022 |
| | | | 340/10.1 |
| 2014/0019003 A1* | 1/2014 | Guinart | B60C 23/0416 |
| | | | 701/34.4 |
| 2014/0139208 A1* | 5/2014 | Tsuge | G01P 3/487 |
| | | | 324/207.25 |
| 2015/0070004 A1* | 3/2015 | Lerchenmueller | F01D 17/06 |
| | | | 324/207.25 |

FOREIGN PATENT DOCUMENTS

| | | | | |
|---|---|---|---|---|
| DE | 102005052707 | | 6/2006 | |
| DE | 102008008072 | | 7/2009 | |
| DE | 102008064047 | | 4/2010 | |
| EP | 2184589 | | 5/2010 | |
| GB | 2085595 A | * | 4/1982 | ........... G01D 18/008 |
| WO | 2010037812 A2 | | 4/2010 | |

OTHER PUBLICATIONS

German Search Report for German Application No. 20 2013 011 157.7 dated Feb. 18, 2014, including partial translation.
European Office Action for European Application No. 14 784 026.8, dated Feb. 13, 2019, 6 pages.

* cited by examiner

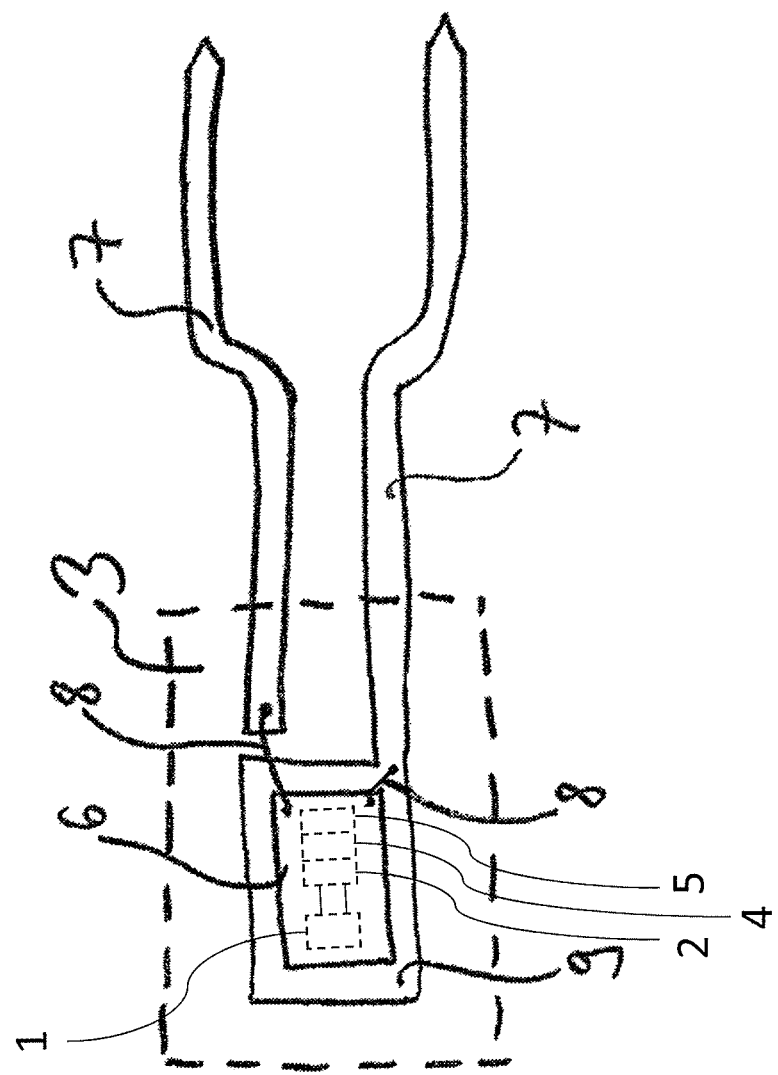

SENSOR COMPRISING AN INTEGRATED IDENTIFICATION DEVICE

CROSS REFERENCE TO RELATED APPLICATIONS

This application is the U.S. National Phase Application of PCT International Application No. PCT/EP2014/071586, filed Oct. 8, 2014, which claims priority to German Patent Application No. 20 2013 011 157.7, filed Dec. 17, 2013, the contents of such application being incorporated by reference herein.

FIELD OF THE INVENTION

The invention relates to a sensor comprising at least one sensor element, at least one signal processing circuit and at least one package that contains the sensor element and the signal processing circuit.

BACKGROUND OF THE INVENTION

In the automotive sector, great demands are placed on sensors, particularly with respect to fail-safety and trackability of the individual sensors. As an example of such sensors, it is possible to cite wheel speed sensors, the output signals from which are used for various driving dynamics controllers, such as ABS, ASR or ESP, for example.

SUMMARY OF THE INVENTION

An aspect of the invention is based on proposing an improved sensor, particularly a sensor that allows better quality and/or reliability monitoring and/or evaluation.

It is preferred for the identification device to comprise at least one data memory unit in which particularly at least one identification datum is storable or stored. Particularly preferably, every sensor on a production run is therefore provided with a univocal identification index or a univocal identification identifier.

An identification datum is expediently understood to mean the singular of identification data.

It is expedient that the sensor has a data transmission interface that comprises particularly a data transmission line or a wireless data transmission unit and also comprises particularly at least one interface signal processing unit. The interface signal processing unit particularly preferably has at least one voltage or current source that is used to produce and provide output signals from the sensor. Quite particularly preferably, the interface signal processing unit comprises multiple current sources that are used to produce an output signal from the sensor that is defined or formed by an impressed current signal having multiple levels.

It is preferred for the data transmission interface to be in a form such that it can transmit the at least one identification datum to an external electronic device.

It is expedient for the data transmission interface to be in a form such that it can receive the at least one identification datum from an external electronic device and can store it in the data memory unit of the identification device.

The external electronic device is preferably understood to mean an external computer unit, particularly comprising a database, to which specific data or information from the sensor are/is transmitted from the sensor and that then transmits an identification datum, which is expediently generated in the database, to the sensor and stores it therein. In this case, the identification datum is univocal for a billion sensors, for example.

The at least one sensor element of the sensor is preferably in the form of a magnetic field sensor element, particularly in the form of a Hall element or magnetoresistive sensor element, such as an AMR sensor element or a GMR sensor element, for example.

It is preferred for the identification device to be in a form such that it comprises and/or stores and/or provides at least one essentially unique self-identification datum for this sensor as an electronic apparatus and/or a type identification datum for the sensor, which has at least one piece of information about the specification of the sensor type with which this sensor is associated as an electronic apparatus, as an identification datum in the or its at least one data memory unit.

It is preferred for the signal processing circuit and the electronic identification device and also particularly the at least one sensor element to be integrated in at least one electronic component, particularly in the form of an ASIC.

Expediently, the self-identification datum and/or type identification datum of the sensor in this case comprises, by way of example, a wafer batch number and/or a piece of information about the ASIC coordinates on the wafer, based on the common electronic component or the ASIC. Particularly preferably, one or both of these pieces of information or data, for example the wafer batch number and/or the piece of information about the ASIC coordinates, are transmitted from the sensor to the external electronic device during or before or after manufacture of the sensor, after which an, in particular univocal, identification datum of the respective sensor is generated in the external electronic device, particularly in the database thereof, and is then transmitted from the external electronic device to the sensor and is stored in the data memory unit of the identification device of the sensor.

It is expedient for the sensor to comprise a leadframe to which the signal processing circuit, the sensor element and the identification device are electrically and mechanically connected, particularly for the signal processing circuit, the sensor element and the identification device to be integrated in a single common electronic component, wherein the signal processing circuit, the sensor element and the identification device or the common electronic component and the leadframe are embedded at least to some extent in a plastic package and wherein the leadframe is electrically and mechanically connectable or connected to a connector or a cable.

The sensor preferably has a single plastic package.

It is preferred for the sensor to be in the form of a wheel speed sensor.

An aspect of the invention relates moreover to the use of the sensor in motor vehicles.

Furthermore, the invention relates moreover to a method of manufacture or to a method of programming as part of a method of manufacture for the sensor, particularly by means of an external electronic device, particularly comprising a database, wherein the external electronic device is expediently connected to the interface signal processing unit of the sensor, particularly preferably by means of a cable.

BRIEF DESCRIPTION OF THE DRAWINGS

Further preferred embodiments will emerge from the subclaims and the description of an exemplary embodiment below with reference to a FIGURE.

In a schematic illustration,

FIG. 1 shows an exemplary embodiment of a sensor.

DETAILED DESCRIPTION OF THE PREFERRED EMBODIMENTS

FIG. 1 illustrates an exemplary sensor that has leadframe 7, with mounting island 9 on which a common electronic component 6, in the form of an ASIC, is arranged. The ASIC 6 has a sensor element 1, for example an AMR sensor element, a signal processing circuit 2, an identification device 4 and a data transmission interface 5, jointly integrated on the chip of the ASIC. ASIC 6 is electrically connected to the leadframe 7 by means of bonding wires 8. ASIC 6, the mounting island 9 of the leadframe 7 and a portion of the leadframe are injection molded and packaged in a single plastic package 3. The legs of the leadframe 7 can be used to connect the sensor to an external electronic device, for example comprising a database, by means of a connector or cable in a manner that is not shown. According to the example, identification device 4 has a data memory unit, not shown, in which at least one identification datum is storable or stored or overwritable.

LIST OF REFERENCE SYMBOLS

1 sensor element
2 signal processing circuit
3 package
4 identification device
5 data transmission interface
6 common electronic component or ASIC
7 leadframe
8 bonding wires
9 mounting island

The invention claimed is:

1. A sensor comprising:
at least one magnetic field sensor element configured to sense a magnetic field,
at least one signal processing circuit connected to receive and process a signal from the at least one magnetic field sensor element, and
at least one package that contains the at least one magnetic field sensor element and the at least one signal processing circuit, wherein
the sensor has an electronic identification device and a data transmission interface that comprises a data transmission line or a wireless data transmission unit, the electronic identification device configured to receive an at least one identification datum from an external electronic device via the data transmission interface and store the at least one identification datum in a data memory unit of the electronic identification device, and
the sensor has a leadframe to which the at least one signal processing circuit, the at least one magnetic field sensor element and the electronic identification device are electrically and mechanically connected, the electronic identification device configured to communicate with the external electronic device via the leadframe.

2. The sensor as claimed in claim 1, wherein the data transmission interface is in a form such that it can transmit the at least one identification datum to an external electronic device.

3. The sensor as claimed in claim 1, wherein the electronic identification device is in a form such that it comprises and/or stores and/or provides
at least one essentially unique self-identification datum for the sensor as an electronic apparatus
and/or
a type identification datum for the sensor, which has at least one piece of information about a specification of the sensor type with which the sensor is associated as an electronic apparatus,
as the at least one identification datum in the at least one data memory unit.

4. The sensor as claimed in claim 1, wherein the at least one signal processing circuit and the electronic identification device and the at least one sensor element are integrated in at least one electronic component.

5. The sensor as claimed in claim 1, wherein the at least one signal processing circuit, the at least one sensor element, the electronic identification device and the leadframe are embedded at least to some extent in a plastic package and wherein the leadframe is electrically and mechanically connectable or connected to a connector or a cable.

6. The sensor as claimed in claim 5, wherein the sensor has a single plastic package.

7. The sensor as claimed in claim 1, wherein the sensor is in the form of a wheel speed sensor.

8. The sensor as claimed in claim 4, wherein the at least one electronic component is in the form of an ASIC.

9. The sensor as claimed in claim 5, wherein the at least one signal processing circuit, the at least one sensor element and the electronic identification device are integrated in a single common electronic component.

* * * * *